US00RE37986E

(19) United States
(12) Reissued Patent
Heitschel et al.

(10) Patent Number: US RE37,986 E
(45) Date of Reissued Patent: *Feb. 11, 2003

(54) CODING SYSTEM FOR MULTIPLE TRANSMITTERS AND A SINGLE RECEIVER

(75) Inventors: Carl Heitschel, Downers Grove, IL (US); Colin Willmott, Buffalo Grove, IL (US); Wayne Schindler, Lisle, IL (US)

(73) Assignee: The Chamberlain Group, Inc., Elmhurst, IL (US)

( * ) Notice: This patent is subject to a terminal disclaimer.

(21) Appl. No.: 09/504,146

(22) Filed: Feb. 15, 2000

(Under 37 CFR 1.47)

Related U.S. Patent Documents

Reissue of:
(64) Patent No.: 4,750,118
Issued: Jun. 7, 1988
Appl. No.: 06/792,661
Filed: Oct. 29, 1985

U.S. Applications:

(63) Continuation of application No. 08/700,610, filed on Aug. 12, 1996, now Pat. No. Re. 36,703, which is a continuation of application No. 08/425,724, filed on Apr. 20, 1995, now Pat. No. Re. 35,364, which is a continuation of application No. 08/087,142, filed on Jul. 2, 1993, now abandoned, which is a continuation of application No. 07/715,006, filed on Jun. 13, 1991, now abandoned, which is a continuation of application No. 07/398,379, filed on Aug. 24, 1989, now abandoned, which is a continuation-in-part of application No. 06/615,339, filed on May 30, 1984, now Pat. No. 4,638,433.

(51) Int. Cl.[7] ..... G06F 19/00; G08C 19/00; E05F 15/20

(52) U.S. Cl. ..... 700/90; 340/5.23; 340/5.64; 340/5.71; 340/825.69; 340/825.72; 49/25

(58) Field of Search ..... 700/90; 340/5.23, 340/5.2, 5.64, 825.22, 825.69, 825.72, 426, 539, 825.56, 825.57, 825.63, 825.65, 825.71, 825.73, 825.74, 825.75, 825.76, 542, 543; 341/176; 318/16, 480, 262–266, 282, 466–468; 70/277, 278.1, 271; 361/171, 172; 49/25, 28, 31, 70, 324; 235/382.5, 382; 455/186.01, 186.02

(56) References Cited

U.S. PATENT DOCUMENTS 3,233,239 A 2/1966 Crow et al.

(List continued on next page.)

FOREIGN PATENT DOCUMENTS

CH 614 769 A5 8/1976
DE 27 46 532 A1 4/1979 ..... H03J/1/22

(List continued on next page.)

OTHER PUBLICATIONS

Expert Report of Thomas Austin Gafford dated Jan. 16, 2002.

(List continued on next page.)

*Primary Examiner*—Edwin C. Holloway, III
(74) *Attorney, Agent, or Firm*—Fitch, Even, Tabin & Flannery

(57) ABSTRACT

The present invention comprises a system for remote control of garage doors and other devices wherein an extremely large number of codes are available for remote transmitters for operating the garage operator and wherein each transmitter has its own unique and permanent nonuser changeable code. The receiver at the garage door operator is capable of storing and remembering a number of different codes corresponding to different transmitters such that the receiver can be programmed so as to actuated by more than one transmitted code thus allowing two or more transmitters to actuate the same garage door operator and wherein the receiver stores the valid codes for the different transmitters.

58 Claims, 3 Drawing Sheets

U.S. PATENT DOCUMENTS 3,337,992 A 8/1967 Tolson ..... 49/29
3,579,240 A 5/1971 Deming ..... 343/228
3,716,865 A 2/1973 Willmott ..... 343/225
3,732,465 A 5/1973 Palmer
3,893,121 A 7/1975 Ringer ..... 343/225
3,898,582 A 8/1975 Deming ..... 331/75
3,906,348 A 9/1975 Willmott ..... 325/37
3,911,397 A 10/1975 Freeny, Jr. ..... 340/147
3,936,833 A 2/1976 Bush ..... 343/225
4,037,201 A 7/1977 Willmott ..... 340/167
4,063,410 A 12/1977 Welling ..... 58/38 R
4,064,487 A 12/1977 Russell et al. ..... 340/168
RE29,525 E 1/1978 Willmott ..... 325/37
4,066,964 A 1/1978 Costanza et al. ..... 325/55
4,081,747 A 3/1978 Meyerle ..... 325/37
4,103,238 A 7/1978 Deming et al. ..... 325/141
4,119,896 A 10/1978 Estes, III et al. ..... 318/266
4,130,738 A 12/1978 Sandstedt ..... 179/90 B
4,141,010 A 2/1979 Umpleby et al. ..... 343/225
4,148,012 A 4/1979 Baump et al. ..... 340/149 A
4,178,549 A 12/1979 Ledenbach et al. ..... 325/38 R
4,218,681 A 8/1980 Hörmann
4,241,540 A 12/1980 Depperman ..... 49/199
4,241,870 A 12/1980 Marcus ..... 296/37.7
4,263,536 A 4/1981 Lee et al. ..... 318/266
4,286,262 A 8/1981 Wahl ..... 340/694
4,291,411 A 9/1981 Müller et al. ..... 455/88
4,303,911 A 12/1981 Hulick ..... 340/825.69
4,305,060 A 12/1981 Apple et al. ..... 340/825.65
4,315,249 A 2/1982 Apple et al. ..... 340/825.52
4,322,855 A 3/1982 Mogi et al. ..... 455/151
4,328,540 A 5/1982 Matsuoka et al. ..... 364/167
4,360,801 A 11/1982 Duhame ..... 340/521
4,366,482 A 12/1982 Remes et al. ..... 340/825.69
4,369,481 A 1/1983 Early ..... 361/173
4,380,762 A 4/1983 Capasso ..... 340/825.63
4,384,288 A 5/1983 Walton
4,385,296 A 5/1983 Tsubaki et al. ..... 340/825.72
4,392,133 A 7/1983 Lundgren
4,393,342 A 7/1983 Matsouka et al. ..... 318/467
4,395,697 A 7/1983 Dargel et al.
4,404,558 A 9/1983 Yen ..... 340/825.72
4,405,923 A 9/1983 Matsuoka et al. ..... 340/825.56
4,417,247 A 11/1983 Dressler ..... 340/825.31
4,418,333 A 11/1983 Schwarzbach et al. .. 340/310 A
4,422,071 A 12/1983 de Graaf ..... 340/825.44
4,426,637 A 1/1984 Apple et al. ..... 340/825.65
4,447,808 A 5/1984 Marcus ..... 340/696
4,453,161 A 6/1984 Lemelson
4,453,269 A 6/1984 Skar ..... 455/129
4,454,509 A 6/1984 Buennagel et al. .... 340/825.69
4,464,651 A 8/1984 Duhame ..... 340/521
4,471,345 A 9/1984 Barrett, Jr.
4,471,408 A 9/1984 Martinez ..... 361/392
4,475,069 A 10/1984 Tadokoro et al. ..... 318/265
4,475,481 A 10/1984 Carroll
4,483,683 A 11/1984 Alley, Sr. ..... 441/69
4,485,382 A 11/1984 Moore ..... 340/825.69
4,491,774 A 1/1985 Schmitz ..... 318/282
4,496,942 A 1/1985 Matsuoka ..... 340/696
4,498,033 A 2/1985 Aihara et al. ..... 318/261
4,499,464 A 2/1985 Knox et al. ..... 340/825.72
4,509,093 A 4/1985 Stellberger ..... 361/172
4,529,980 A 7/1985 Liotine et al. ..... 340/825.52
4,534,194 A 8/1985 Aydin
4,535,333 A 8/1985 Twardowski ..... 340/825.69
4,536,747 A 8/1985 Jensen ..... 340/502
4,550,311 A 10/1985 Galloway et al. ..... 340/531
4,573,046 A 2/1986 Pinnow ..... 340/825.56
4,574,247 A 3/1986 Jacob ..... 329/126
4,581,606 A 4/1986 Mallory ..... 340/539
4,593,412 A 6/1986 Jacob ..... 455/129
4,596,985 A 6/1986 Bongard et al. ..... 340/825.69
4,602,246 A 7/1986 Jensen ..... 340/521
4,602,357 A 7/1986 Yang et al. ..... 367/93
4,633,247 A 12/1986 Hegeler ..... 340/825.69
4,638,433 A 1/1987 Schindler ..... 364/400
4,638,496 A 1/1987 Jensen ..... 375/104
4,646,072 A 2/1987 Hughes ..... 340/696
4,652,860 A 3/1987 Weishaupt et al. ..... 340/539
4,653,565 A 3/1987 Iha et al. ..... 160/193
4,654,745 A 3/1987 Corby ..... 361/171
4,665,397 A 5/1987 Pinnow ..... 340/825.56
4,667,397 A 5/1987 Day et al.
4,670,739 A 6/1987 Kelly, Jr. ..... 340/539
4,692,762 A 9/1987 Lewiner et al. ..... 340/825.69
4,709,412 A 11/1987 Seymour et al. ..... 455/603
4,722,625 A 2/1988 O'Brien ..... 401/6
4,737,770 A 4/1988 Brunius et al. ..... 340/539
4,750,118 A 6/1988 Heitschel et al. ..... 364/400
4,754,255 A 6/1988 Sanders et al. ..... 340/64
4,755,792 A 7/1988 Pezzolo et al. ..... 340/538
4,758,835 A 7/1988 Rathmann et al. ..... 340/825.31
4,794,622 A 12/1988 Isaacman et al. ..... 375/71
4,806,929 A 2/1989 Nishijima et al. ..... 340/825.06
4,808,995 A 2/1989 Clark et al. ..... 340/825.69
4,825,200 A 4/1989 Evans et al. ..... 341/23
4,843,337 A 6/1989 Conn, Jr. et al. ..... 340/906
4,847,542 A 7/1989 Clark et al. ..... 318/560
4,847,601 A 7/1989 Conti ..... 341/176
4,853,524 A 8/1989 Yamaguchi et al. ..... 235/468
4,855,713 A 8/1989 Brunius ..... 340/506
4,864,588 A 9/1989 Simpson et al. ..... 375/1
4,866,434 A 9/1989 Keenan ..... 340/825.72
4,868,559 A 9/1989 Pinnow ..... 340/825.31
4,872,082 A 10/1989 Martel ..... 361/179
4,878,052 A 10/1989 Schulze ..... 340/825.69
4,881,148 A 11/1989 Lambropoulos et al.
4,890,108 A 12/1989 Drori et al. ..... 341/176
4,896,353 A 1/1990 Dehgani et al. ..... 380/6
4,897,652 A 1/1990 Leon ..... 341/51
4,912,463 A 3/1990 Li ..... 340/825.69
4,912,525 A 3/1990 Pinoow ..... 455/612
4,918,439 A 4/1990 Wozniak et al. ..... 340/825.69
4,931,789 A 6/1990 Pinnow ..... 340/825.56
4,932,037 A 6/1990 Simpson et al. ..... 375/1
4,951,029 A 8/1990 Severson ..... 340/506
4,963,876 A 10/1990 Sanders et al. ..... 341/176
4,988,992 A 1/1991 Heitschel et al. ..... 340/825.69
4,995,053 A 2/1991 Simpson et al. ..... 375/1
5,049,867 A 9/1991 Stouffer ..... 340/426
5,140,171 A 8/1992 de Janasz ..... 307/10.8
5,148,159 A 9/1992 Clark et al. ..... 340/825.22
5,184,132 A 2/1993 Baird ..... 341/176
5,220,319 A 6/1993 Kendel ..... 340/825.69
5,252,960 A 10/1993 Duhame ..... 340/825.56
5,252,966 A 10/1993 Lambropoulos et al. ..... 340/825.69
5,343,500 A 8/1994 Betts et al. ..... 375/39

FOREIGN PATENT DOCUMENTS

DE 29 39 589 A1 4/1981 ..... H04Q/9/00
DE 29 41 394 A1 4/1981 ..... H04Q/9/00
DE 30 43 605 A1 7/1982
DE 32 44 049 A1 11/1982
DE 36 25 555 A1 4/1987 ..... E05F/15/20
DE 37 41 324 C2 6/1989 ..... H04Q/9/14
DE 28 56 337 A1 7/1990 ..... H01H/27/06
DE 39 18 131 C2 3/1991 ..... H04Q/9/14
EP 0 103 791 A2 8/1983
EP 0 106 273 B1 10/1983

| | | | | |
|---|---|---|---|---|
| EP | 0 120 162 | A2 | 11/1983 | |
| EP | 0 099 762 | A1 | 2/1984 | ..... E05B/49/00 |
| EP | 0 143 309 | A2 | 6/1985 | ..... E05B/49/00 |
| EP | 0 212 050 | A3 | 3/1987 | ..... E05B/49/00 |
| EP | 0 319 781 | A2 | 6/1989 | ..... G08C/17/00 |
| EP | 0 401 673 | A1 | 12/1990 | ..... G08C/17/00 |
| EP | 0 561 361 | A1 | 9/1993 | ..... E05F/15/00 |
| EP | 0 563 517 | A1 | 10/1993 | ..... E05F/15/16 |
| FR | 2 542 732 | A1 | 3/1983 | |
| GB | 1 423 126 | | 1/1976 | ..... H04Q/7/02 |
| GB | 1 528 901 | | 10/1978 | |
| GB | 2 060 228 | A | 10/1980 | |
| GB | 2 119 548 | A | 3/1982 | |
| GB | 2 131 992 | A | 6/1984 | |
| JP | 54 13288 | | 12/1979 | |
| JP | Sho 55-20830 | | 2/1980 | |
| JP | 55-020830 | | 2/1980 | ..... E05B/49/00 |
| JP | 55 45944 | | 3/1980 | |
| JP | 55-114771 | | 9/1980 | ..... E05F/15/10 |
| JP | 56 118168 | | 9/1981 | |
| JP | 59 65175 | | 4/1984 | |
| JP | 59-080872 | | 5/1984 | ..... E05B/49/00 |

OTHER PUBLICATIONS

Expert Report of Joseph V. Colaianni dated Jan. 22, 2002.

Expert Witness Report of Larry S. Nixon Pursuant to *Fed.R.Civ.P. Rule 26*(a)(2)(b) dated Mar. 4, 2002.

Expert Report of Dr. Sharad Malik Regarding Invalidity dated Mar. 4, 2002.

Linear Corporation's Identification of Prior Art dated Jan. 22, 2002.

Respondents Lynx Industries, Inc., Napoleon Spring Works, Inc., and Guardian Access Corporation's Identification of the Prior Art dated Jan. 11, 2002.

Respondent Martec Access Products, Inc., Identification of Prior Art dated Jan. 11, 2002.

Respondent Wayne–Dalton Corporation's Identification of Prior Art dated Jan. 11, 2002.

Assembler Language Programming: The IBM System 360, George Struble; Addison–Wesley Publishing 1971, pp. 148–151.

Introduction to Microcomputers and Microprocessors, Arpad Barna and Dan Porat; John Wiley & Sons, Inc. 1976; p. 18.

Microprocessor Software; Max Schindler 1980 pp. 65, 67.

The 8086 Family User Manual; Intel Corporation 1980 at 2–35.

The following Litigation Documents are cited herewith.

Respondent Wayne–Dalton Corp.'s Answer to Complaint and Notice of Investigation dated Aug. 6, 2001.

Respondents Lynx Industries, Inc., Napoleon Spring Works, Inc., and Guardian Access Corporation's Response to Verified Complaint Under Section 337 of the Tariff Act of 1930, as Amended, and Affirmative Defenses dated Aug. 8, 2001.

Guardian Access Corporation's Responses to Chamberlain's First Set of Interrogatories (Nos. 1–36) dated Aug. 17, 2001.

Lynx's Responses to chamberlain's First Set of Interrogatories (Nos. 1–34) dated Aug. 17, 2001.

Napoleon's Responses to Chamberlain's First Set of Interrogatories (Nos. 1–34) dated Aug. 17, 2001.

Respondent Innovative Home Products, Inc.'s Responses to First Set of Interrogatories from Complainant Chamberlain dated Aug. 31, 2001.

Linear Corporation's Responses to Chamberlain's First Set of Interrogatories dated Sep. 6, 2001.

Respondent Innovative Home Products Inc.'s Response to Amended Complaint and Notice of Investigation dated Sep. 7, 2001.

Verified Declaration of Wayne–Dalton Corp. dated Sep. 7, 2001.

Respondent Linear Corporation's Amended Response to the Amended Complaint Under Section 337 of the Tariff Act of 1930, as Amended, and Affirmative Defenses dated Sep. 12, 2001.

Respondent Innovative's Responses to the Commission Investigative Staff's First Set of Requests for the Production of Documents and Things to Respondents dated Sep. 14, 2001.

Verified Declaration of Innovative Home Products, Inc. dated Sep. 18, 2001.

Napoleon's Supplemental Response to Chamberlain's Interrogatory No. 9 dated Oct. 3, 2001.

Linear Corporation's Second Supplemental Response to Chamberlain's Interrogatory No. 13 and First Supplemental Response to Chamberlain's Interrogatory No. 7 dated Oct. 10, 2001.

Linear Corporation's First Supplemental Responses to Chamberlain's Interrogatories Nos. 8 and 12 dated Oct. 30, 2001.

Order No. 8: Denying Complainant's Motion to Set a Maximum Number of Interrogatories dated Nov. 21, 2001 (11 pages).

Respondent Wayne–Dalton Corp.'s Answers and Objections to the Third Set of Interrogatories from Chamberlain to Respondent Wayne–Dalton Corporation dated Nov. 26, 2001 (18 pages).

Linear Corporation's First Supplemental Responses to Chamberlain's Interrogatories Nos. 1 and 2 dated Nov. 27, 2001 (7 pages).

Commission Investigative Staff's First Set of Interrogatories to Respondent Computime dated Nov. 28, 2001 (14 pages).

Microchip Technology Incorporated's Petition for Review of Initial Determination Concerning Motion for Intervention and Statement of Reasons Supporting Limited Intervention by Microchip dated Nov. 28, 2001 (13 pages).

Linear Corporation's First Set of Requests for Admission to Complainant Chamberlain dated Nov. 30, 2001 (19 pages).

Complainant Chamberlain's Supplemental Answer to Respondents Napoleon et al.'s Interrogatory No. 1 dated Nov. 30, 2001 (7 pages).

Wayne–Dalton Corp's Supplemental Answers and Objections to Certain of Chamberlain's Interrogatories dated Dec. 3, 2001 (22 pages).

Defendant Interlogix, Inc.'s Answer, Affirmative Defenses, and Counterclaims dated Nov. 2, 2001 (28 pages).

Defendant Interlogix, Inc.'s First Set of Requests for Admission to Plaintiff the Chamberlain Group, Inc. dated Nov. 13, 2001 (51 pages).

Chamberlain's Reply to Interlogix's Counterclaims dated Nov. 27, 2001 (21 pages).

Defendant's Motion for Leave to File Defendant's Supplemental Brief Opposing Plaintiff the Chamberlain Group, Inc's Motion for Sanctions dated Dec. 3, 2001 (35 pages).

Notice of Decision by U.S International Trade Commission dated Nov. 13, 2001 (3 pages).

Notice of Initial Determination by ALJ on Remand from U.S. International Trade Commission dated Nov. 21, 2001 (3 pages).

Verified Declaration of Wayne–Dalton Corp. dated Nov. 9, 2001 (1 page).
Wayne–Dalton Corp.'s Answers and Objections to Chamberlain's First Set of Interrogatories dated Nov. 9, 2001 (16 pages).
Chamberlain's Answers to Wayne–Dalton's First Set of Interrogatories dated Nov. 28, 2001 (11 pages).
Answer, Affirmative Defenses and Counterclaim to Amended Complaint dated Nov. 16, 2001 (14 pages).
First Set of Interrogatories from Chamberlain to Pittway Corporation dated Nov. 21, 2001 (8 pages).
Amended Answer, Affirmative Defenses and Counterclaim to Amended Complaint dated Nov. 21, 2001 (13 pages).
International Publication No. WO 85/01980 dated May 9, 1985, to Pinnow.
The following Litigation Documents are cited herewith.
Chamberlain's Answer to Third Amended Complaint for Declaratory Judgment and Counterclaim dated Mar. 15, 2000 (15 pgs.).
No Commercial Offer for Sale: Shindler's Deposition—pp. 385–386, Wilmott Deposition—pp. 348–353, Lovegrove Deposition—pp. 77–91, Schorling Deposition—pp. 74–79, 84–101, 103–123.
Demonstration of Prototype GDO Without Capability to Learn Multiple Transmitters: Schindler Deposition—pp. 173–180, 184–188, 353–362, 382–384, 386–389, Wilmott Deposition—pp. 330–348, 353–356, 430–434, 436–440, 452–455, 487–492, Schorling Deposition—pp. 102–123.
Documents: Deposition Exhibits 117, 159, 161, 162, 120 and 191.
"Remote Security System", R. Kath et al., IBM Technical Disclosure Bulletin, vol. 16, No. 7 Dec. 1973, pp. 2427–2428.
MOS Databook from National Semiconductor, pp. 1–25–3–64.
In connection with the pending litigation, *The Chamberlain Group, Inc. v. Lynx Industries, Inc.* and *Napoleon Spring Works*, Civil Action No. 00 CV 0454, in the U.S. District Court for the Northern District of Illinois Eastern Division, the following documents are submitted herewith.
Defendant Lynx Industries, Inc. and Napoleon Spring Works, Inc. Answer in Opposition to Plaintiff Chamberlain's Motion for a Preliminary Injuction dated Nov. 30, 2000.
Reply Memorandum in Support of Chamberlin's Motion for Preliminary Injuction dated Dec. 15, 2000, which includes the following Exhibits.
Ex. 15—Second Declaration for Dr. V. Thomas Rhyne.
Ex. 17—Intro. to Microprocessors: Software, Hardware, Programming.
Ex. 18—Transcript Depositon of Wayne Schindler, vol. IV, pp. 393–398, 435–440, 483–488, 519–524, 537–554.
Ex. 19—Letter dated May 26, 2000 from David M. Frischkorn (for Lynx Industries) to Karl Fink (for Chamberlain Group, Inc.).
Ex. 20—Letter dated Jun. 14, 2000 from A. Blair Hughes (for Lynx Industries) to Karl Fink (for Chamberlain Group, Inc.).
Defendants' Supplemental Brief in Support of Its Motion for Summary Judgment of Non–Infringement and Its Opposition to Chamberlain's Motion for Preliminary Injuction dated Feb. 12, 2001, which includes the following Exhibits.
Ex. A—Copy of U.S. Ct. of Appeals, Federal Circuit case: *Festo Corporation v. Shoketsu Kinzoku Kogyo Kabushiki Co., Ltd.*
Ex. B—File History of U.S. Pat. No. 4,750,118 dated Jun. 7, 1988, Heitschel et al.
Ex. C—Comparison of Originally filed "Memory Selection Switch" Claim Element to Issued Claims Showing Narrowing Amendments.
Defendants' Supplemental Brief Opposing Plaintiff's Motion for Preliminary Injuction dated Feb. 22, 2001, which includes the following Exhibits.
Ex. A—Copy of Overhead Door's Emergency Motion for Judgment as a Matter of Law as to Inequitable Conduct . . . (in *Overhead Door Corporation and GMI Holdings, Inc. v. The Chamberlain Group, Inc.*).
Ex. B—Office Action dated Jun. 13, 1990 in Heitschel et al. S.N. 07/398,379.
Ex. C—Amendment and Request for Reconsideration dated Oct. 17, 1990 in Heitschel et al. S.N. 07/398,379.
Ex. D—Transcript of Telephonic Conference Before the Honorable Sidney A. Fitzwater, U.S. District Judge (in *Overhead Door Corporation and GMI Holdings, Inc. v. The Chamberlain Group, Inc.*).
Chamberlain's Supplemental Reply Memorandum in Support of Chamberlain's Motion for Preliminary Injunction dated Mar. 13, 2001, which includes the following attachments and Exhibits: *F & G Scrolling v. IBM*, MPEP, Seventh Edition, 715.02 (2000).
Ex. 1—Copy of the four claims contained in the Chamberlain application filed Aug. 24, 1989 to reissue the '118 patent.
Ex. 2—First Office Action dated Jun. 13, 1990 in Heitschel et al. S.N. 07/398,379.
Ex. 3—Examiner Interview Summary Record dated Sep. 23, 1990.
Ex. 4—Amendment and Request for Reconsideration dated Oct. 17, 1990.
Ex. 5—A) Declaration of Wayne Schindler Under 37 C.F.R. § 1.31 dated Oct. 3, 1990, B) Declaration of Colin Wilmott Under 37 C.F.R. § 1.131 dated Oct. 15, 1990, C) Declaration of Carl Heitschel Under 37 C.F.R. § 1.131 dated Oct. 1, 1990, D) Diagram dated Jul. 17, 1984, E) Chamberlain Inter–House Correspondence: Minutes of 1984 GDO Meeting and New Electronic Products, F) Chamberlain Inter–House Correspondence: Proposed Up GDO.
Ex. 6—Amendment dated Oct. 22, 1992.
Ex. 7—PTO–1449 Form, signed and dated Feb. 21, 1995 by Examiner Ruggiero.
Ex. 8—Decision on Appeal of Carl Heitschel, Colin Willmott, and Wayne Schindler in Appeal No. 1999–0880.
Ex. 9—a) Transcript Depos. of Wayne Schindler, pp. 2–5, 62–69, 393–398, 531–536 and Transcript Depos. of Colin Wilmott p. 191–196, 311–316 (both in *Overhead Door v. Chamberlain*) b) Depos. of Colin Wilmott dated Dec. 13, 1996, pp. 1–8, 160–167, 167–173, 191–196, 323–328.
Ex. 10—Suppl. Expert Report of Dr. V. Thomas Rhyne (in *Overhead Door v. Chamberlain*).
Ex. 11—Third Suppl. to Expert Witness Report of Edward G. Fiorito (in *Overhead Door v. Chamberlain*).
Ex. 12—Chamberlain's Suppl. Answers to Interrogatories (in *Overhead Door v. Chamberlain*).
Ex. 13—Chamberlain's Proposed Findings of Fact and Conclusions of Law With Respect to Inequitable Conduct (in *Overhead Door v. Chamberlain*).
Ex. 14—Letter dated Sep. 29, 1990 to Scott Clark at Chamberlain from Richard B. Wakely (in *Overhead Door v. Chamberlain*).

Ex. 15—Copy of Office Action dated Dec. 24, 1990.
Lynx Industries Inc. and Napoleon Spring Works, Inc.'s First Amended Answer and Counterclaims to the First Amended Complaint dated Mar. 13, 2001.
In connection with the pending litigation, *Overhead Door Corporation and GMI Holdings, Inc. v. The Chamberlain Group, Inc.,* Civil Action No. 3:95–CV–1648–D, in the U.S. District Court for the Northern District of Texas, Dallas Division, the following documents are submitted herewith.
Third Amended Complaint for Declaratory Judgment dated Mar. 1, 2000.
Expert Report of A. Sidney Katz dated Aug. 1, 2000, which includes the following Exhibits.
Ex. A—Curriculum Vitae of A. Sidney Katz.
Ex. B—List of Cases in which A. Sidney Katz has served as a Patent Expert.
Expert Report of M. Ray Mercer, Ph.D. dated Aug. 1, 2000, which includes the following Exhibits.
Ex. A—Curriculum Vitae of M. Ray Mercer.
Ex. B—List of Previous Expert Witness Work of M. Ray Mercer.
Ex. C—Sources Consulted.
Plaintiff's Notice of Videotaped Depositions dated Aug. 30, 2000.
Fourth Amended Complaint for Declaratory Judgment dated Aug. 31, 2000.
Expert Report of Joseph C. McAlexander dated Sep. 18, 2000, which includes the following Exhibits.
Ex. A—Detailed Expert Report of Joseph C. McAlexander on the Re. 35,364 Patent.
Ex. A.1—Claims of Chamberlain's Re. 35,364 Patent.
Ex. B—Documents Relied Upon.
Ex. C—Curriculum Vitae of Joseph C. McAlexander.
Ex. D—List of Cases in which Joseph C. McAlexander has testified as an expert.
Ex. E—Compensation.
Rebuttal Expert Report of A. Sidney Katz dated Sep. 18, 2000.
Plaintiff's Second Supplemental Responses to Defendant's Interrogatories Nos. 1–3, 14 and 20 dated Nov. 2, 2000.
Plaintiff's Second Supplemental Notice Pursuant to 35 U.S.C. § 282 dated Nov. 3, 2000.
In connection with the pending litigation, *The Chamberlain Group, Inc. v. Innovative Home Products, Inc.* Civil Action No. 00–C–0360, in the U.S. District Court for the Northern District of Illinois Eastern Division, the following documents are submitted herewith.
Innovative's Further Supplement Response to Chamberlain's Interrogatory No.'s 1, 2 and 5 and Notice of Prior Art Under 35 U.S.C. § 282 date Nov. 20, 2000.
Innovative's Fourth Supplemental Answers to Chamberlain's Contention Interrogatories dated Dec. 15, 2000.
Defendant's Response to Plaintiff's Third Set of Interrogatories dated Mar. 21, 2001.
Articles and German Opposition Materials.
Meyer–Staufenbiel, Torsten. "Garagentoantrieb mit Funkfernsteuerung", pp. 115–117, 1975.
Alltronik Opposition Brief of Aug. 7, 1990, (with translation), corresponding to German Patent No. 36 25 555 including.
a) Exhibit E4, Prior Publication and Prior Public Use of Corresponding Transmitter/Receiver System.
b) A corresponding Description.
c) A Second Corresponding Description.
d) Two invoices.
e) An Illustration by the Opposer.
Dorma Opposition Brief of Aug. 8, 1990 of corresponding to German Patent No. 36 25 555. This includes eight (8) Exhibits which are identified in German as follows.
a. Bedienungs—und Einbauanweisung für den Multisender S 43–25 (Drunckschrift 102 der Fa. Th. Düppe KG in Essen).
b. Schreiben von 5. März an das FTZ in Darmstadt.
c. Bedienungsanleitung für UHF–Funksteurerung F 43 vom 05.09.1984.
d. Prospekt der Fa. Düppe (Druckschrift Nr. 63—Tormatic macht das Tor auf).
e. Prospekt der fa. Düppe von Apr. 1983—Tormatic UHF Funksteuerung.
f. Prospekt der Fa. Düppe, Title: Tormatic öffnet alle Tore.
g. Der Elektroniker, Heft 11 von Nov. 1981, Seite 11–19.
e. Elektronik 1975. Heft 10, Seite 104–105 (einfache Fernsteuerung für 9 Kanäle).
Pp. 36 and 37 of an undated dealer reference manual for the AT&T Security System 8000.
Installation And Operation Manual SS–32 Supervised Security System, 1984.
IEEE Standard Dictionary of Electrical and Electronic Terms, Second Edition, Frank Jay editor–in–chief, Wiley–Interscience, 1977, pp. 324–325, 377–378, 384, 500 and 694.
U.S. Pat. No. 4,692,762 corresponds to EP 0 099 762 A1 and provides a concise explanation of its relevance. U.S. Pat. No. 4,750,118 corresponds to EP 0 319 781 A2 and DE 37 41 324 C2 and provides a concise explanation of their relevance.
Japanese Patent Office Translation of Japanese Patent Application Disclosure No. Sho 55–20830 to Tomoma, laid–open Feb. 14, 1980.
Japanese Patent Office Translation of Japanese Patent Application Disclosure No. Sho 59–80872 to Okuyama et al., laid–open May 10, 1984.
A copy and translation of a Japanese Patent Office action dated Oct. 20, 1992, received in a Japanese patent application related to the instant application and providing a concise explanation of the relevance of JP 55–114771 and JP 59–80872.
Translation of pertinent portions of JP 55–114771, (indicating that U.S. Pat. No. 4,328,540 substantially corresponds to this Japanese patent).
Derwent WPI Acc. No. 85–136225 provides an English abstract of EP 0 143 309 A2.
Derwent WPI Acc. No. 86–332914 provides an English abstract of EP 0 212 050 A2.
Derwent WPI Acc. No. 90–369740 provides an English abstract of EP 0 401 673 A1.
Derwent WPI Acc. No. 93–296664 provides an English abstract of EP 0 561 361 A1.
Derwent WPI Acc. No. 93–312974 provides an English abstract of EP 0 563 517 A1.
Derwent WPI Acc. No. 79–D6700B provides an English abstract of DE 27 46 532 A1.
Derwent WPI Acc. No. 80–G1895C provides an English abstract of DE 28 56 337 A1.
Derwent WPI Acc. No. 81–D1971D provides an English abstract of DE 29 39 589 A1.
Derwent WPI Acc. No. 81–B6887D provides an English abstract of DE 29 41 394 A1.

Derwent WPI Acc. No. 90–36974D provides an English abstract of DE 39 18 131 C2.

Special Master's Second Amended Report and Recommendation on Plaintiff's Motion for Summary Judgement of Patent Validity under 35 U.S.C. §103, filed Jan. 16, 1998, and Exhibits 1–3 thereto.

Special Master's Report for Summary Judgment of Infringement, filed Jan. 8, 1998, and Exhibits 1 and 3–9 thereto (certain portions of this report have been redacted and Exhibit 2 has been excluded, as being confidential pursuant to a protective order and cannot be disclosed except by court order).

Special Master's Report and Recommendation on Plaintiff's Motion for Partial Summary Judgement of Patent Invalidity under U.S.C. §251, filed Dec. 10, 1997, and Exhibits 1–11 thereto.

Special Master's Report and Recommendation on Plaintiff's Motion for Partial Summary Judgement of Assignor Estoppel, filed Dec. 12, 1997, and Tabs 2, 3, 5, 17, and 18 of Exhibit A and Exhibit C thereto (certain portions of this Report have been redacted and Exhibits A (including Tabs 1, 4, and 16) and b have been included, as being confidential pursuant to a protective order and cannot be disclosed except by court order).

Second Amended Complaint for Declaratory Judgment, filed Feb. 17, 1998, and Exhibits A–G thereto.

Plaintiff's Supplemental Notice Pursuant to 35 U.S.C. §282, filed May 18, 1998.

Letter from Kenneth R. Glaser to John F. Flannery dated Mar. 31, 1997 (redacted to delete references to the litigation).

Order of Apr. 30, 1998 adopting the Special Master's Reports and Recommendations.

Defendant–Appellant's Appeal Brief dated Aug. 24, 1998.

Plaintiff's–Appellees Appeal Brief dated Oct. 8, 1998.

Appellant's Reply Brief dated Oct. 26, 1998.

Opinion announcing Judgment of the Court dated Oct. 13, 1999.

Errata Sheet for the Opinion Announcing Judgement of the Court dated Oct. 15, 1999.

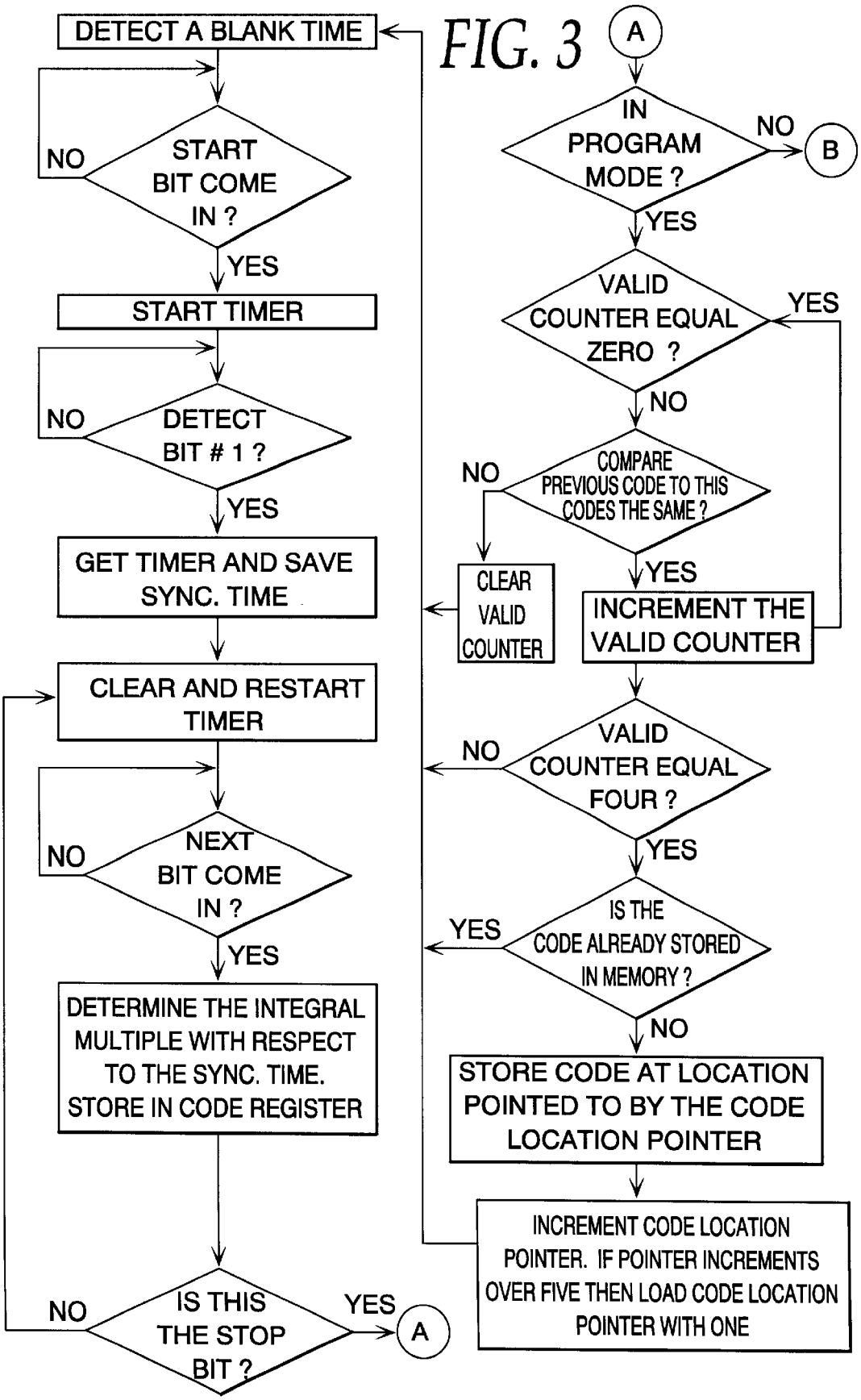
FIG. 3
DETECT A BLANK TIME
START BIT COME IN ?
NO
YES
START TIMER
DETECT BIT # 1 ?
NO
YES
GET TIMER AND SAVE SYNC. TIME
CLEAR AND RESTART TIMER
NEXT BIT COME IN ?
NO
YES
DETERMINE THE INTEGRAL MULTIPLE WITH RESPECT TO THE SYNC. TIME. STORE IN CODE REGISTER
IS THIS THE STOP BIT ?
NO
YES
A
A
IN PROGRAM MODE ?
NO
B
YES
VALID COUNTER EQUAL ZERO ?
YES
NO
COMPARE PREVIOUS CODE TO THIS CODES THE SAME ?
NO
YES
CLEAR VALID COUNTER
INCREMENT THE VALID COUNTER
VALID COUNTER EQUAL FOUR ?
NO
YES
IS THE CODE ALREADY STORED IN MEMORY ?
YES
NO
STORE CODE AT LOCATION POINTED TO BY THE CODE LOCATION POINTER
INCREMENT CODE LOCATION POINTER. IF POINTER INCREMENTS OVER FIVE THEN LOAD CODE LOCATION POINTER WITH ONE

CODING SYSTEM FOR MULTIPLE TRANSMITTERS AND A SINGLE RECEIVER

Matter enclosed in heavy brackets [ ] appears in the original patent but forms no part of this reissue specification; matter printed in italics indicates the additions made by reissue.

CROSS-REFERENCES TO RELATED APPLICATIONS

[This application comprises an improvement on application Ser. No. 615,339, filed May 30, 1984, U.S. Pat. No. 4,638,433, in which the inventor is Wayne R. Schindler assigned to the assignee of the present application.] *This application is a continuation of application Ser. No. 08/700,610 filed Aug. 12, 1996, now U.S. Pat. No. Re. 36,703, which is a continuation of application Ser. No. 08/425,724 filed Apr. 20, 1995, now U.S. Pat. No. Re. 35,364, Oct. 29, 1996, which is a continuation of Ser. No. 08/087,142, Jul. 2, 1993, abandoned, which is a continuation of Ser. No. 07/715,006, Jun. 13, 1991, abandoned, which is a continuation of Ser. No. 07/398,379, Aug. 24, 1989, abandoned, which is a reissue application of U.S. Pat. No. 4,750,118, which is a continuation-in-part of application Ser. No. 06/615,339 filed May 30, 1984, now U.S. Pat. No. 4,638,433.*

BACKGROUND OF THE INVENTION

1. Field of the Invention

This invention relates in general to garage door operators and in particular to a novel garage door operator wherein the receiver can be energized by two or more transmitted codes which are stored in the receiver.

2. Description of the Prior Art

Garage door operators of the prior art used transmitters in which the code can be changed by various methods as, for example, by moving two position switches to change the code. Such systems have also used code changing switches in the receiver so that the receivers can be set to correspond to the selected transmitter code.

It has also been known to use fixed frequency transmitters and fixed frequency receivers such that if the transmitted frequency matches the receiver frequency the receiver will respond.

SUMMARY OF THE INVENTION

It is an object of the present invention to provide a plurality of transmitters wherein each transmitter has its own unique and permanent non-user changeable code and wherein the receiver can be placed into a program mode wherein it will receive and store two or more codes corresponding to two different transmitters. The number of codes which can be stored in transmitters can be extremely high as, for example, greater than one million codes. Thus, the invention makes it possible to eliminate the requirements for code selection switches in the transmitters.

In the present invention the decoder module in the receiver will be capable of learning several different transmitted codes which will eliminate code switches in the receiver and also provides for multiple transmitters for actuating the garage opener.

The communication link can be various system such as radio frequency, light, wires, etc.

The invention makes it very easy for the user to operate the system and more secured code systems are available due to the higher number of available codes.

An encoded signal will be utilized wherein a pulse and blank time comprises a sync time base and different link pulses such as 1, 2, 3 or 4 milliseconds can be selected so as to provide different codings. Each datum can be 1, 2, 3 or 4 times the length of the sync pulse. The timing is from the rising edge to rising edges of the pulse and with ten data bits the number of codes can be in excess of one million codes.

In the invention, each transmitter encoder will contain a chip which contains a unique code and the receives will be able to memorize two or more as, for example, five different transmitter codes. This eliminates the need to have coding switches in either the transmitter or receiver. This eliminates the requirement that the user set the code switches so they match since the code switches are eliminated.

In the invention, during an operate mode, a receiver code must match an already programmed code four times in order to operate the garage door. This match is referred to as a valid code. Each valid code can be separated by up to two error codes and still have the output indicated as accurate.

In the program mode a code must be received four times in a row in order to be permanently stored in the receiver. Any error code will reset the valid code counter.

The advantage of the coding scheme are:

1. Higher peak power without exceeding the FCC rules which gives longer transmitter range.

2. Eliminate code switches in the transmitter and receiver making it easier for a customer to install and operate his garage door operator.

3. Customers having more than one transmitter will not have to match codes.

4. More secure codes due to the higher number of combinations which are available. Other objects, features and advantages of the invention will be readily apparent from the following description of certain preferred embodiments thereof, taken in conjunction with the accompanying drawings although variations and modifications may be effected without departing from the spirit and scope of the novel concepts of the disclosure and in which:

BRIEF DESCRIPTION OF THE DRAWINGS

FIG. 3 comprises a flow diagram;

DESCRIPTION OF THE PREFERRED EMBODIMENTS

Figure 1:
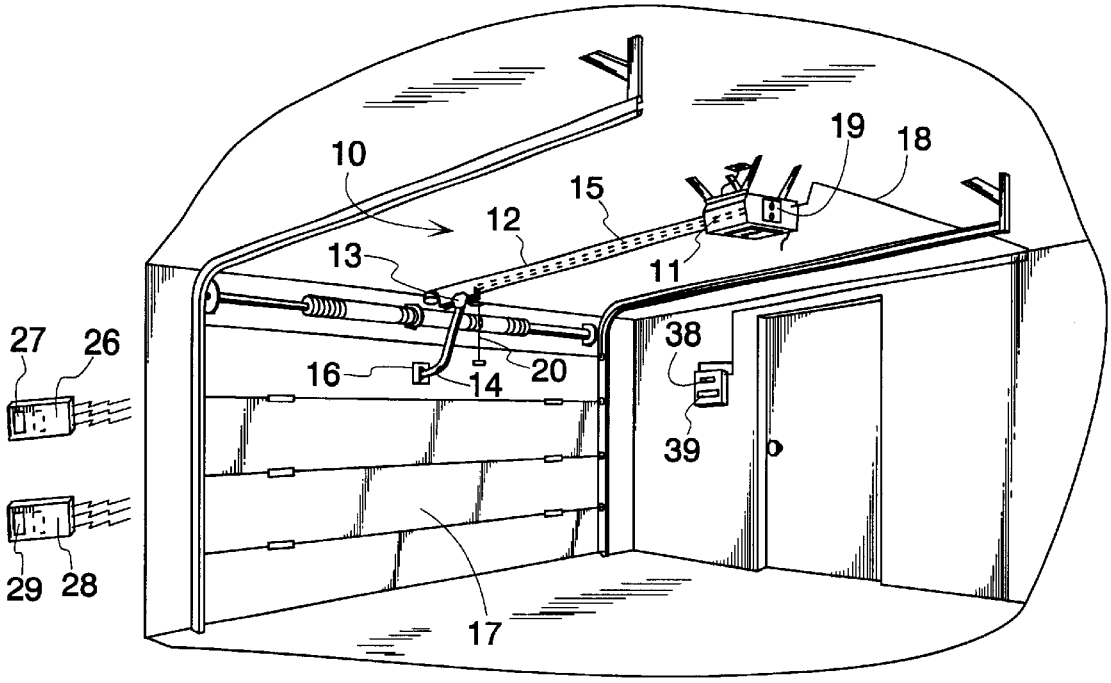
FIG. 1 is a prespective view illustrating a garage door operator.

FIG. 1 illustrates a garage door operator 10 mounted to the ceiling of a garage and connected to operate a door 17. Garage door operator 10 has a head unit 11 which is supported from the ceiling which includes a motor which drives a suitable chain to which a trolley 13 is attached so that it moves along a rail 12. The trolley 13 has a release cord 20 and pivotally carries a lever arm 14 which is attached to a bracket 16 mounted to the door so as to raise and open it by pulling it along conventional rails.

The header unit 11 includes a receiver and operating mechanism and can be actuated from a control unit 38 which has a operate switch 39.

The garage door operator can also be operated by the transmitters 26 and 28 which have operate transmit buttons 27 and 29, respectively.

Figure 2:
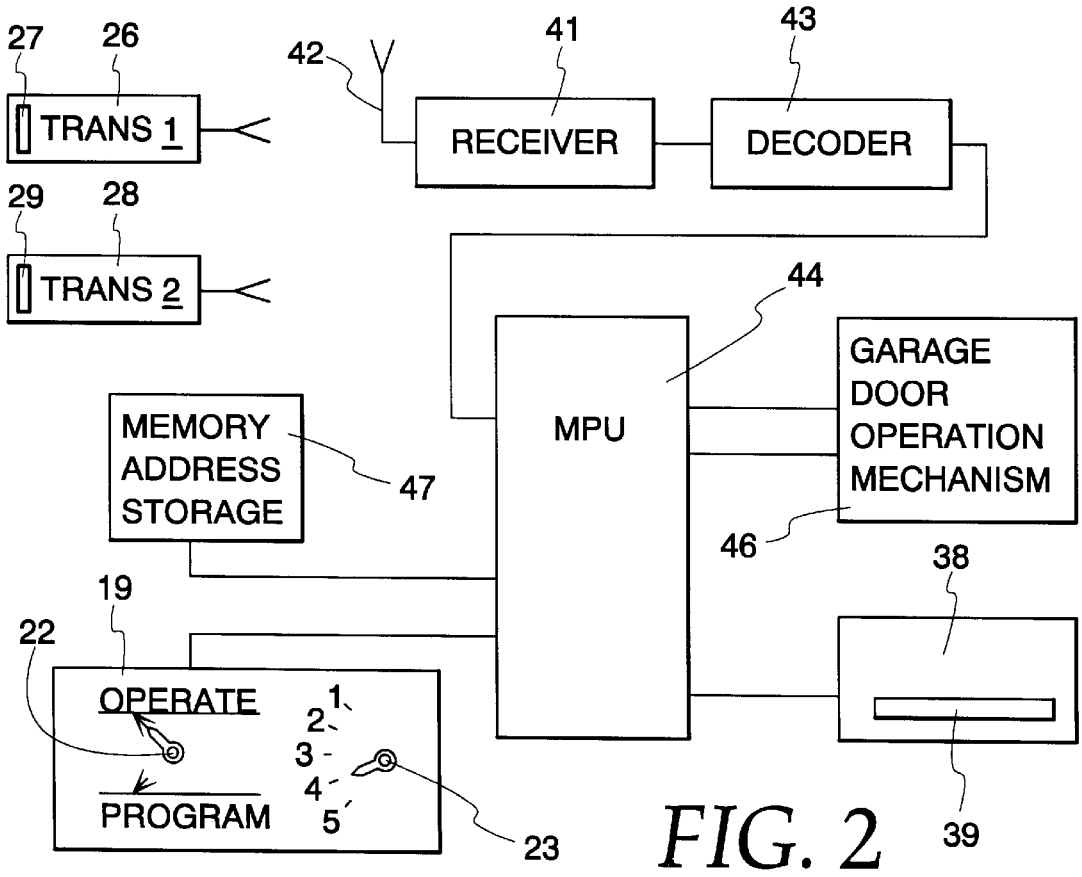
FIG. 2 illustrates in block form the invention.

As illustrated in FIG. 2 the garage door operator includes a receiver 41 which has a suitable antenna 42 for receiving radio frequency transmissions from the transmitters 26 and 28 and supplies an input to a decoder 43 which provides an output to a microprocessor unit 44. The microprocessor unit 44 is connected to a garage door operator mechanism 46 which includes the motor which drives the chain 15 to move the door 17 in a conventional manner. The control 38 is connected to the microprocessor 44. A pair of switches 22 and 23 are mounted on a switch unit 19 connected to the unit 11 and also to the microprocessor 44. The switch 22 is a two position switch that can be moved between the operate and program positions to establish the "operate" and "program" modes. The switch 23 can be moved to a number of selected positions indicated by the 1 through 5 so as to allow the particular code of a number of different transmitters to be stored in the receiver so that the receiver will respond to such codes.

Figure 5:
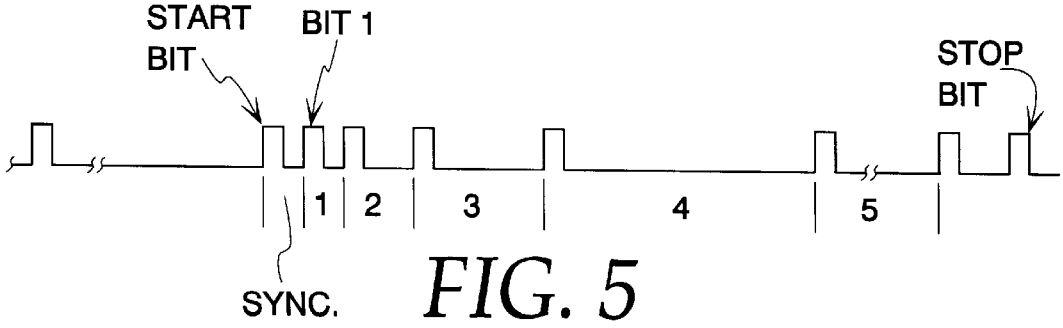
FIG. 5 illustrates the coding scheme.

In the illustrated embodiment, the receiving unit can respond to up to five different transmitters which have five different transmitting codes. FIG. 5 illustrates the code utilized in which the bit times are nominally 0.5 milliseconds for example. The data times are nominally 1, 2, 3 or 4 milliseconds.

The sync pulse is a unit measure of time. Each datum is measured with respect to the sync pulse and each datum can be 1, 2, 3 or 4 times the length of the sync pulse. The timing is from the rising edge to rising edge of adjacent pulses. Using 10 data bits the number of codes which is available is in excess of one million codes.

In the invention, each transmitter such as transmitters 26 and 28 will have a unique code which is determined by the encoder chip contained in the transmitter. The receiver unit will be able to memorize and store a number of different codes as, for example, five different transmitter codes which eliminates the need of coding switches in either the transmitter or receiver which are used in the prior art. This also eliminates the requirement that the user match the transmitter and receiver code switches.

When the garage door operator is initially installed, the switch 22 is moved to the program mode and the energize button 27 of the first transmitter 26 is depressed so that the unique code of the transmitter 26 is transmitted. This is received by the receiver 41 and decoded by the decoder 43 and supplied to the microprocessor unit 44. The switch 23 is placed in the first position and with the switch 22 in the program mode the code of the transmitter 26 will be supplied to the memory address storage 47 and stored therein. Then if the switch 22 is moved to the operate mode and the transmitter 26 energized by depressing the transmit switch 27, the receiver 41, decoder and the microprocessor 44 will compare the received code with the code of the transmitter 26 stored in the first memory location in the memory address storage 47 and since the stored memory address for the transmitter 26 coincides with the transmitted code of the transmitter 26 the microprocessor 44 will energize the garage door operation mechanism 46 to open or close the door.

In order to store the code of the second transmitter 28 the switch 22 is moved again to the program mode and the switch 23 to the second position and the transmitter 28 is energized by depressing its transmit switch 29. This causes the receiver 41 and decoder 43 to decode the transmitted signal and supply it to the microprocessor 44 which then supplies the coded signal of the transmitter 28 to the memory address storage 47 where it is stored in a second address storage location. Then the switch 22 is moved to the operate position and when either of the transmitters 26 and 28 are energized, the receiver 41 decoder 43 and microprocessor 44 will energize the garage door operation mechanism 46 to cause the door to either move up or down depending upon its initial position. Thus, the codes of the transmitters 26 and 28 are transmitted and stored in the memory address storage 47 during the program mode after which the garage door operation mechanism will respond to either of the transmitters 26 and 28. Any desired number of transmitters can be programmed to operate the garage door mechanism as, for example, up to five transmitters can be programmed into the memory address storage 47 by using the program switch 22 and the selector switch 23.

This invention eliminates the requirement that binary switches be set in the transmitter or receiver as is done in systems of the prior art to establish a code to which the receiver will respond and the invention also allows a garage door operator to respond to a number of different transmitters because the specific codes of a number of the transmitters is stored and retained in the memory address storage 47 of this unit.

Figure 4:
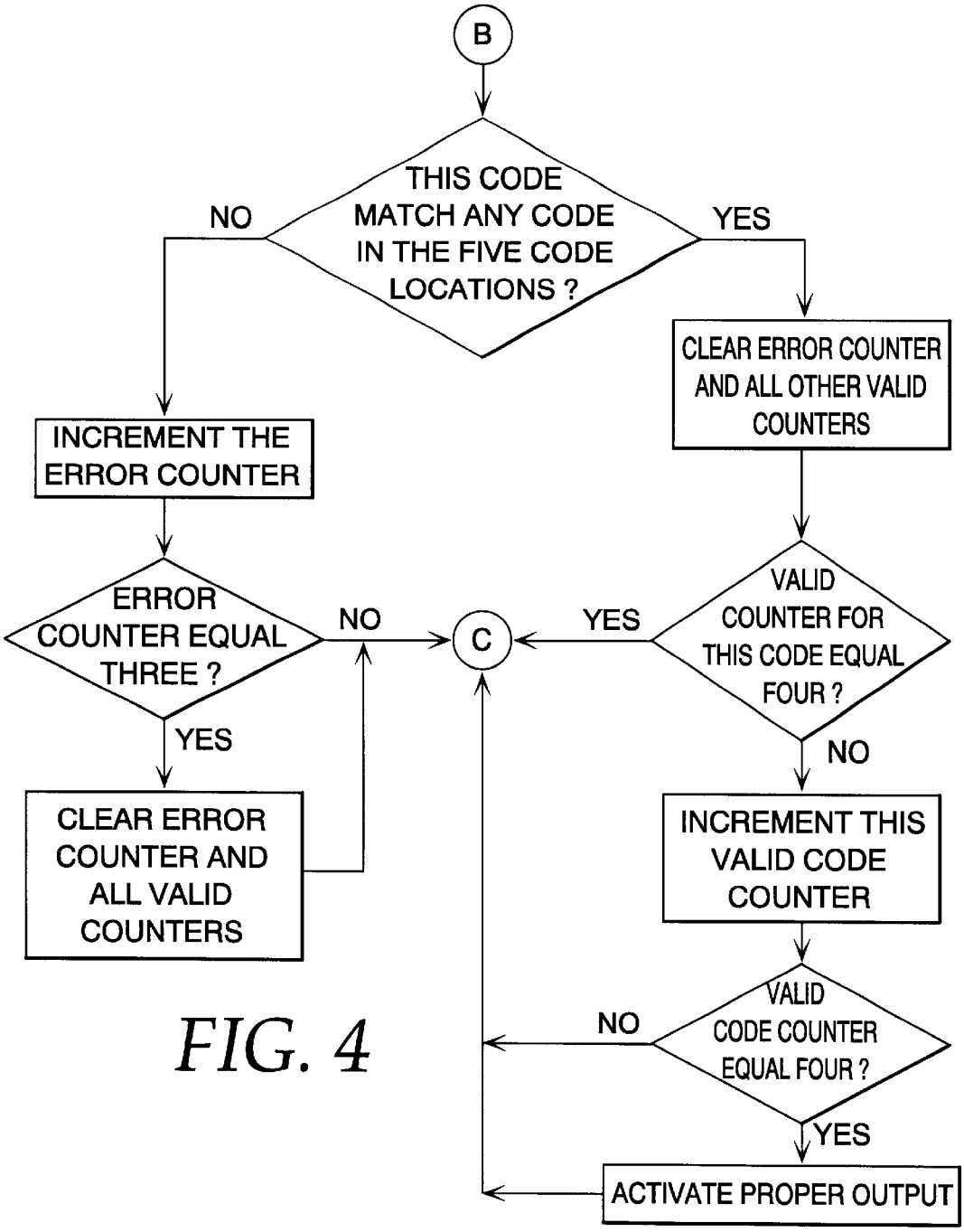
FIG. 4 is a continuation of the flow diagram.

FIGS. 3 and 4 comprise the flow chart which describe both the operate and program modes of the invention. Basically, in the operate mode, a received code must match a program which has already been programmed and for four times so as to operate the garage door. This match is referred to as a valid code in the flow chart. Each valid code can be separated by up to two error codes and still have the output actuate. For example, a code of valid-error-error-valid-valid-valid would actuate the door. On the other hand, a code of valid-valid-valid-error-error-error-valid would not actuate the door.

In the program mode a code must be received four times in a row in order to be permanently stored. Any error code will reset the valid code counter.

With reference to the flow diagrams of FIGS. 3 and 4 if it be assumed initially that the switch 22 is in the operate position an incoming signal will be supplied to terminal A in FIG. 3 and an output will be supplied to terminal B which indicates that the switch 22 is not in the program mode but in the operate mode Terminal B is illustrated in FIG. 4 and the microprocessor compares the incoming code with any codes in the five code locations stored in the memory address storage 47. If these codes match then the error counter is cleared and all other valid counters. If the valid counter receives the code four times [than] *then* output is supplied to the terminal C which operates the garage door operator. If the valid counter for the code equals less than 4, then the valid code counter is incremented until the valid code counter does equal 4 which actuates the proper output. Relative to FIG. 4 if the input code does not match any of the five stored codes, then the error counter is incremented and when the error counter equals 3 the error counter is cleared and all valid counters are cleared.

If the switch 22 is in the program mode as shown in FIG. 3 when the incoming signal from a transmitter is received, the flow diagram is followed so as to store the new incoming program in the code location pointed to by the code location pointer [23]. It is to be noted that up to five addresses can be stored in the system of the invention.

It is seen that the present invention allows a receiving system to respond to one of a plurality of transmitters which have different unique codes which can be stored in the receiver during a program mode. Each time the "program mode switch" 22 is moved to the program position, a different storage area as determined by the switch 23 can be connected so that the new transmitter code would be stored in that address. After all of the address storage capacity have been used additional codes would erase all old codes in the memory address storage before storing a new one.

Although the invention has been described with respect to preferred embodiments, it is not to be so limited as changes and modifications may be made which are within the full intended scope as defined by the appended claims.

We claim as our invention:

[1. A garage door operator for a garage door comprising, a garage door operation mechanism with an output shaft connected to said garage door to open and close it, a radio receiver, a decoder connected to receive the output of said radio receiver, a microprocessor connected to receive the output of said decoder and to said garage door operation mechanism to energize it, a switch moveable between program and operate positions connected to said microprocessor to place said microprocessor in the operate or the program mode, a memory means for storing a plurality of addresses connected to said microprocessor when said switch is in the program position, a memory selection switch connected to said microprocessor, a plurality of radio transmitters with different codes, said memory selection switch setable in a first position at a time when a first one of said radio transmitters is energized so that the code of said first transmitter will be stored in said memory means and said memory selection switch setable in a second position at a time when a second one of said radio transmitters is energized so that the code of said second transmitter will be stored in said memory means, and said microprocessor placed in the operate mode when said switch is in the operate position so that either or both of said first and second radio transmitters when energized cause said microprocessor to energize said garage door operator mechanism.]

[2. A garage door operator for a garage door according to claim 1 wherein said first and second radio transmitters when energized radiate coded signals and said microprocessor receives and compares coded signals from said first and second transmitters with coded signals stored in said memory means and said microprocessor produces a garage door operate signal if the received transmitted signal and any one of said coded signals stored in said memory means match.]

[3. A garage door operator according to claim 2 wherein said memory selection switch has "n" positions where "n" is an integer and the codes of "n" transmitters can be stored in said memory means when said switch is in the program mode.]

[4. A garage door operator according to claim 3 wherein the code stored in said memory means can be changed by placing said switch in the program mode and one of said plurality of transmitters is energized which has a code which differs from the code previously stored in said memory means.]

*5. A remotely controlled system comprising:*

*at least one radio frequency transmitter having a non-user changeable code for radio frequency transmitting a radio frequency transmission corresponding to the transmitter;*

*a radio frequency receiver for being adapted to receive the first-mentioned radio frequency transmission from the first-mentioned radio frequency transmitter and being adapted to receive a second radio frequency transmission from a second radio frequency transmitter having a second non-user changeable code, different from said first non-user changeable code;*

*a program mode designator for designating a program mode;*

*a memory comprising a plurality of storage locations;*

*a processor having a processor controlled code location pointer and responsive to a program mode designation by said program mode designator and the reception by said radio frequency receiver of said first-mentioned radio frequency transmission for storing a first stored code corresponding to the first-mentioned radio frequency transmitter in one of said plurality of storage locations derived from the processor controlled code location pointer, the processor responsive to said program mode designation by said program mode designator and the reception by said receiver of said second radio frequency transmission for storing a second stored code corresponding to the second radio frequency transmitter in another of said plurality of storage locations derived from the processor controlled code location pointer, and the processor responsive to an operate mode and the reception of said first-mentioned radio frequency transmission after the storage of said first stored code for providing an operate output and responsive to said operate mode and to the reception of said second radio frequency transmission after the storage of said first and second stored codes for providing an operate output.*

*6. A remotely controlled system according to claim 5 wherein the processor comprises a microprocessor.*

*7. A remotely controlled system according to claim 5 wherein said processor controlled code location pointer comprises a software controlled code location pointer.*

*8. A remotely controlled system according to claim 7 wherein the processor comprises a microprocessor.*

*9. A remotely controlled system comprising:*

*a first radio frequency transmitter having a first non-user changeable code and for radio frequency transmitting a first radio frequency transmission corresponding to the first transmitter;*

*a second radio frequency transmitter having a second non-user changeable code, different from said first non-user changeable code and for radio frequency transmitting a second radio frequency transmission corresponding to the second transmitter; and*

*an operator for providing an operate output, said operator comprising:*

*a radio frequency receiver for receiving said first and said second radio frequency transmissions;*

*a program mode designator for designating a program mode;*

*a memory comprising a plurality of storage locations;*

*a processor having a software controlled code location pointer and responsive to a program mode designation by said program mode designator and the reception by said radio frequency receiver of said first radio frequency transmission for storing a first stored code corresponding to the first radio frequency transmitter in one of said plurality of storage locations derived from the software controlled code location pointer, the processor responsive to said program mode designation by said program mode designator and the reception by said receiver of said second radio frequency transmission for storing a second stored code corresponding to the second radio frequency transmitter in another of said plurality of storage locations derived from the software controlled code location pointer, and the processor*

*responsive to an operate mode and the reception of said first radio frequency transmission after the storage of said first stored code for providing an operate output and responsive to said operate mode and to the reception of said second radio frequency transmission after the storage of said first and said second stored codes for providing an operate output.*

*10. A remotely controlled system according to claim 9 wherein the processor comprises a microprocessor.*

*11. A remotely controlled system comprising, a radio receiver, a decoder connected to receive the output of said radio receiver, a microprocessor connected to receive the output of said decoder and to provide an operate output, a program/operate selector connected to said microprocessor to place said microprocessor in a program mode, memory means for storing a plurality of non-user changeable codes connected to said microprocessor when said program/operate selector is in the program position, a memory selector for selecting respective storage addresses in the memory means, a plurality of radio transmitters with different non-user changeable codes, said memory selector pointing to a first storage address at a time when a first one of said radio transmitters is energized so that the code of said first transmitter will be stored in said memory means in said first address and said memory selector pointing to a second storage address at a time when a second one of said radio transmitters is energized so that the code of said second transmitter will be stored in said memory means in said second address, and said microprocessor placed in the operate mode when said program/operate selector is in the operate position so that either of said first and second radio transmitters when energized cause said microprocessor to provide an operate output.*

*12. A remotely controlled system according to claim 11 wherein said first and second radio transmitters when energized radiate coded signals and said microprocessor receives and compares coded signals from said first and second transmitters with coded signals stored in said memory means and said microprocessor produces an operate output if the received transmitted signal and any one of said coded signals stored in said memory means match.*

*13. A remotely controlled system according to claim 11 wherein said memory selector has "n" positions where "n" is an integer and the codes of "n" transmitters can be stored in said memory means when said switch is in the program mode.*

*14. A remotely controlled system according to claim 11 wherein the code stored in said memory means can be changed by placing said program/operate selector in the program mode and one of said plurality of transmitters is energized which has a code which differs from the code previously stored in said memory means.*

*15. A remotely controlled system according to claim 11 wherein the memory selector comprises a software controlled code location pointer identifying a memory address.*

*16. A remotely controlled system comprising: a radio receiver, a decoder connected to receive the output of said radio receiver, a microprocessor connected to receive the output of said decoder and generate an operate output, a selector for selecting a program state connected to said microprocessor to place said microprocessor in the program mode, a memory for storing a plurality of codes connected to said microprocessor when said selector is in the program state position, a memory selector for selecting respective storage addresses in the memory, a plurality of radio transmitters with different non-user changeable codes, said memory selector being adapted to select a first storage location at a time when a first one of said radio transmitters is energized so that the code of said first transmitter will be stored in said memory in the first location and said memory selector being adapted to select a second storage location at a time when a second one of said radio transmitters is energized so that the code of said second transmitter will be stored in said memory in said second location, and said microprocessor placed in the operate mode when said selector is in the operate state so that either of said first and second radio transmitters, when energized cause said microprocessor to provide the operate output.*

*17. A remotely controlled system according to claim 16 wherein the memory selector comprises a software controlled code location pointer identifying a memory address.*

*18. A remotely controlled system according to claim 16 wherein said first and second radio transmitters when energized radiate coded signals and said microprocessor receives and compares coded signals from said first and second transmitters with coded signals stored in said memory and said microprocessor provides the operate output if the received transmitted signal and any one of said coded signals stored in said memory match.*

*19. A remotely controlled system according to claim 16 wherein said memory selector has "n" states where "n" is an integer and the codes of "n" transmitters can be stored in said memory means when said selector is in the program state.*

*20. A remotely controlled system according to claim 16 wherein the code stored in said memory can be changed by placing said selector in the program state and one of said plurality of transmitters is energized which has a code which differs from at least one of the codes previously stored in said memory.*

*21. A remotely controlled system according to claim 17 wherein the microprocessor increments the code location pointer to select the memory addresses to store the respective transmitter codes.*

*22. A remotely controlled system comprising: a plurality of RF transmitters, each of said transmitters having its own different non-user changeable transmitter code and having an RF emitter for transmitting when energized, an RF signal carrying a code from which the transmitter code can be derived; a receiver for receiving said coded RF transmissions; a decoder for deriving a code corresponding to the transmitter code in the energized transmitter; a processor for providing in its operate mode an operate output and for providing in its program mode a derived code for storage; a mode selector connected to said processor for placing said processor in its program mode; a memory having a plurality of addresses for storing a plurality of derived codes under the control of said processor; a memory selector controlled by said processor for identifying respective ones of the memory addresses; said memory selector identifying one of the memory addresses so that the processor, when in its program mode, causes the derived code of one of the transmitters to be stored in said memory at the one memory address, and said memory selector identifying a second memory address so that the processor, when in its program mode, causes the derived code of a second transmitter to be stored in said memory at the second memory address; said processor, when in its operate mode, determining whether the derived code and one of the stored codes correspond, said processor providing an operate output in response to derived code and stored code correspondence.*

*23. A remotely controlled system in accordance with claim 22, wherein the processor determines whether the derived code has been previously stored in any of the memory*

*locations and if the derived code is already stored, the processor does not cause the derived code to be stored.*

*24. A remotely controlled system in accordance with claim 22, wherein if a derived code is stored in all the available storage locations, the memory selector will select one of the memory addresses to be erased and the processor causes the derived code to be stored in that location.*

*25. A remotely controlled system in accordance with claim 22, wherein the processor is prevented from producing the operate output until the processor determines that the derived code corresponds with the stored code a preset plurality of times.*

*26. A remotely controlled system in accordance with claim 22, wherein the processor is prevented from storing a derived code until the same derived code is received a preset plurality of times.*

*27. A remotely controlled system in accordance with claim 22 wherein the processor comprises a microprocessor.*

*28. A remotely controlled system comprising: a plurality of RF transmitters, each of said RF transmitters having its own different, non-user changeable transmitter code and having a transmitter for transmitting when energized, an RF signal carrying a code from which the transmitter code can be derived; a receiver for receiving said coded RF transmissions; a decoder for deriving a code corresponding to the transmitter code of the energized transmitter; a processor for providing in its operate mode an operate output; a mode selector connected to said processor for placing said processor in its program mode; an addressable memory having a plurality of addresses controlled by said processor for storing a plurality of derived codes; a software controlled memory selector controlled by said processor for identifying respective ones of the memory addresses; said software controlled memory selector identifying one of the memory addresses so that the processor, when in its program mode, causes the derived code of one of the transmitters to be stored in said addressable memory at the one memory address, and said software controlled memory selector identifying another memory address so that the processor, when in its program mode, causes the code of a second transmitter to be stored in said addressable memory at the memory address; said processor, when in its operate mode, determining whether the derived code corresponds with at least one of the stored codes and when there is correspondence said processor providing an operate output.*

*29. A remotely controlled system according to claim 28 wherein the processor comprises a microprocessor.*

*30. A remotely controlled system for providing an operate output responsive to transmitted codes comprising: a radio receiver, a decoder connected to receive an output of said radio receiver, a processor connected to receive an output of said decoder and provide the operate output, a selector for selecting a program state connected to said processor to place said processor in the program mode, a memory for storing a plurality of codes connected to said processor when said selector is in the program state position, a memory selector for selecting respective storage addresses in the memory, a plurality of radio transmitters with different non-user changeable codes, said memory selector being adapted to select a first storage location at a time when a first one of said radio transmitters is energized so that the code of said first transmitter will be stored in said memory in the first location and said memory selector being adapted to select a second storage location at a time when a second one of said radio transmitters is energized so that the code of said second transmitter will be stored in said memory in said second location, and said processor placed in the operate mode when said selector is in the operate state so that either of said first and second radio transmitters, when energized cause said processor to provide the operate output.*

*31. A remotely controlled system according to claim 30 wherein the processor comprises a microprocessor.*

*32. A remotely controlled system according to claim 31 wherein the memory selector comprises a software controlled code location pointer identifying a memory address.*

*33. A remotely controlled system according to claim 31 wherein said first and second radio transmitters when energized radiate coded signals and said microprocessor receives and compares coded signals from said first and second transmitters with coded signals stored in said memory and said microprocessor provides the operate output if the received transmitted signal and any one of said coded signals stored in said memory match.*

*34. A remotely controlled system according to claim 30 wherein said memory selector has "n" states where "n" is an integer and the codes of "n" transmitters can be stored in said memory when said selector is in the program state.*

*35. A remotely controlled system according to claim 30 wherein the code stored in said memory can be changed by placing said selector in the program state and one of said plurality of transmitters is energized which has a code which differs from the code previously stored in said memory.*

*36. A remotely controlled system according to claim 32 wherein the microprocessor increments the code location pointer to select the memory addresses to store the respective transmitter codes.*

*37. A system for controlling the operation of equipment comprising:*

*at least one radio frequency transmitter having a non-user changeable code for transmitting a radio frequency transmission corresponding to the transmitter;*

*a radio frequency receiver being adapted to receive the first-mentioned radio frequency transmission from the first-mentioned radio frequency transmitter and being adapted to receive a second radio frequency transmission from a second radio frequency transmitter having a second non-user changeable code, different from said first non-user changeable code;*

*a program mode designator for designating a program mode;*

*a memory comprising a plurality of storage locations;*

*a processor having a processor controlled code location pointer and being responsive to a program mode designation by said program mode designator and the reception by said radio frequency receiver of said first-mentioned radio frequency transmission for storing a first stored code corresponding to the first-mentioned radio frequency transmitter in one of said plurality of storage locations derived from the processor controlled code location pointer, the processor responsive to said program mode designation by said program mode designator and the reception by said receiver of said second radio frequency transmission for storing a second stored code corresponding to the second radio frequency transmitter in a storage location derived from the processor controlled code location pointer and where the first stored code is not stored, and the processor responsive to an operate mode and the reception of said first-mentioned radio frequency transmission after the storage of said first stored code for operating the equipment and responsive to said operate mode and to the reception of said*

*second radio frequency transmission after the storage of said first and said second stored codes for operating the equipment.*

*38. A system for controlling the operation of equipment according to claim 37 wherein said processor controlled code location pointer comprises a software controlled code location pointer.*

*39. A system for controlling the operation of equipment comprising:*

*a first radio frequency transmitter having a first non-user changeable code and for transmitting a first radio frequency transmission corresponding to the first transmitter;*

*a second radio frequency transmitter having a second non-user changeable code, different from said first non-user changeable code and for transmitting a second radio frequency transmission corresponding to the second transmitter; and*

*an operator for controlling the operation of the equipment, said operator comprising:*

*a radio frequency receiver for receiving said first and said second radio frequency transmissions;*

*a program mode designator for designating a program mode;*

*a memory comprising a plurality of storage locations;*

*a processor having a processor controlled code location pointer and being responsive to a program mode designation by said program mode designator and the reception by said radio frequency receiver of said first radio frequency transmission for storing a first stored code corresponding to the code of the first radio frequency transmitter in one of said plurality of storage locations derived from the processor controlled code location pointer, the processor responsive to said program mode designation by said program mode designator and the reception by said receiver of said second radio frequency transmission for storing a second stored code corresponding to the code of the second radio frequency transmitter in a storage location derived from the processor controlled code location pointer and where the first stored code is not stored, and the processor responsive to an operate mode and the reception of said first radio frequency transmission after the storage of said first stored code for controlling the operator and responsive to said operate mode and to the reception of said second radio frequency transmission after the storage of said first and said second stored codes for controlling the operator.*

*40. A system for controlling the operation of equipment comprising:*

*a first radio frequency transmitter having a first non-user changeable code and for transmitting a first radio frequency transmission corresponding to the first transmitter;*

*a second radio frequency transmitter having a second non-user changeable code, different from said first non-user changeable code and for transmitting a second radio frequency transmission corresponding to the second transmitter; and*

*an operator for controlling the operation of the equipment, said operator comprising:*

*a radio frequency receiver for receiving said first and said second radio frequency transmissions;*

*a program mode designator for designating a program mode;*

*a memory comprising a plurality of storage locations;*

*a processor having a software controlled code location pointer and being responsive to a program mode designation by said program mode designator and the reception by said radio frequency receiver of said first radio frequency transmission for storing a first stored code corresponding to the code of the first radio frequency transmitter in one of said plurality of storage locations derived from the software controlled code location pointer, the processor responsive to said program mode designation by said program mode designator and the reception by said receiver of said radio frequency transmission for storing a second stored code corresponding to the code of the second radio frequency transmitter in a storage location derived from the software controlled code location pointer and where the first stored code is not stored, and the processor responsive to an operate mode and the reception of said first radio frequency transmission after the storage of said first stored code for controlling the equipment and responsive to said operate mode and to the reception of said second radio frequency transmission after the storage of said first and said second stored codes for controlling the equipment.*

*41. An operator for controlling operation of equipment comprising, a mechanism connected to said equipment to operate it, a radio receiver, a decoder connected to receive an output of said radio receiver, a microprocessor coupled to receive an output of said decoder and coupled to said mechanism to energize it, a device moveable between operate and program positions to place said microprocessor in the program mode, memory means for storing codes in a plurality of addresses coupled to said microprocessor when said device is in the program position, a memory selector for selecting storage addresses in the memory means, a plurality of radio transmitters with different non-user changeable codes, said memory selector selecting a storage address at a time when a first one of said radio transmitters is energized so that a code corresponding to the code of said first transmitter is be stored in said memory means in said first selected address, and said memory selector selecting a storage address at a time when a second one of said radio transmitters is energized and where the first stored code is not stored so that a code corresponding to the code of said second transmitter will be stored in said memory means at that selected address, and said microprocessor being placed in the operate mode when said device is in the operate position so that either of said first and second radio transmitters when energized cause said microprocessor to energize said mechanism.*

*42. An operator according to claim 41 wherein said first and second radio transmitters when energized radiate coded signals, said microprocessor receives and compares coded signals from said first and second transmitters with coded signals stored in said memory means, and said microprocessor produces a controller operate signal if the received transmitted signal and any one of said coded signals stored in said memory means correspond.*

*43. An operator according to claim 41 wherein said memory selector has "n" positions where "n" is an integer and the codes corresponding to the codes of "n" transmitters can be stored in said memory means when said device is in the program mode.*

*44. An operator according to claim 41 wherein the code corresponding to the code of a transmitter is only stored in said memory means by placing said microprocessor in the*

*program mode, and one of said plurality of transmitters is energized which has a code which differs from the code of a transmitter previously stored in said memory means.*

*45. An operator according to claim 41 wherein the memory selector comprises a software controlled code location pointer identifying a memory address.*

*46. An operator for controlling operation of equipment comprising: a radio receiver, a decoder connected to receive the output of said radio receiver, a microprocessor connected to receive the output of said decoder and coupled to said equipment to energize it, a device coupled to said microprocessor to place said microprocessor in an operate mode or a program mode, memory means for storing a plurality of addresses coupled to said microprocessor when said microprocessor is in the program mode, memory selection means for selecting a storage address in the memory, a plurality of radio transmitters with different non-user changeable codes, said memory selection means being adapted to select a first storage location at a time when a first one of said radio transmitters is energized so that a code corresponding to the code of said first transmitter will be stored in said memory means in the first location, and said memory selection means being adapted to select a storage location when a second one of said radio transmitters is energized, and where the corresponding code of said one transmitter is not stored so that the code corresponding to the code of said second transmitter will be stored in said memory means in that location, and when said microprocessor is placed in the operate mode either of said first and second radio transmitters, when energized cause said microprocessor to energize said equipment.*

*47. An operator according to claim 46 wherein the memory selection means comprises a software controlled code location pointer identifying a memory address.*

*48. An operator according to claim 46 wherein said first and second radio transmitters when energized radiate coded signals corresponding to the codes in said transmitters, said microprocessor receives and compares coded signals from said first and second transmitters with the coded signals stored in said memory means, and said microprocessor produces an operate signal if the codes in the received transmitted signal and any one of said coded signals stored in said memory means correspond.*

*49. An operator according to claim 47 wherein said memory selection means has "n" states where "n" is an integer, and the codes corresponding to the codes of "n" transmitters can be stored in said memory means when said microprocessor is in the program mode.*

*50. An operator according to claim 47 wherein the code corresponding to the code of a transmitter is only stored in said memory means by placing said microprocessor in the program mode, and one of said plurality of transmitters is energized which has a code which differs from the code of a transmitter previously stored in said memory means.*

*51. An operator according to claim 47 wherein the microprocessor increments the code location pointer to select the memory addresses to store the respective transmitter codes.*

*52. A system for controlling access to an area comprising: a plurality of RF transmitters, each of said transmitters having its own different non-user changeable transmitter code and having means for transmitting when energized an RF signal carrying a code from which the transmitter code can be derived; a receiver for receiving said coded RF transmissions; a decoder for deriving a code corresponding to the transmitter code in the energized transmitter; processor means for providing in its operate mode an operating signal to grant access to said area and for providing in its program mode a derived code for storage; a device moveable between an operate position and a program position for respectively placing said processor means in its operate mode and program mode; memory means having a plurality of addresses for storing a plurality of codes corresponding to the derived codes under the control of said processor means; a memory address selector controlled by said processor means to identify memory addresses; said memory selector identifying one of the memory addresses so that the processor means, when in its program mode, causes a code corresponding to the derived code of one of the transmitters to be stored in said memory means at the one memory address, and said memory selector identifying a memory address where the corresponding code of the one transmitter is not stored so that the processor means, when in its program mode, causes a code corresponding to the derived code of a second transmitter to be stored in said memory means at that identified memory address; said processor means, when in its operate mode, determining whether the derived code and one of the stored codes correspond, said processor means providing an operating signal to grant access to the area upon correspondence.*

*53. A system in accordance with claim 52, wherein the processor means determines whether the corresponding derived code has been previously stored in any of the memory addresses and if the corresponding derived code is already stored, the processor means does not cause the corresponding derived code to be stored.*

*54. A system in accordance with claim 52, wherein corresponding derived codes have been stored in all the available storage addresses, the memory selector will select one of such already written storage addresses and the processor means causes the most recently received corresponding derived code to be stored in that address.*

*55. A system in accordance with claim 52, wherein means are provided to prevent the processor means from granting access until the processor means determines that the derived code corresponds with the stored code a preset plurality of times.*

*56. A system in accordance with claim 52, wherein means are provided to prevent the processor means from storing a corresponding derived code until the same derived code is received a preset plurality of times.*

*57. A system for granting access to an area comprising: a plurality of RF transmitters, each of said RF transmitters having its own different, non-user changeable transmitter code and having a transmitter for transmitting when energized, an RF signal carrying a code from which the transmitter code can be derived; a receiver for receiving said coded RF transmissions; a decoder for deriving a code corresponding to the transmitter code of the energized transmitter; a processor for providing in its operate mode an operating signal to a mechanism to energize it; a mode selector for placing said processor in its program mode; an addressable memory having a plurality of addresses for storing a plurality of derived codes; a software controlled memory selector controlled by said processor for identifying respective ones of the memory addresses; said software controlled memory selector identifying one of the memory addresses so that the processor, when in its program mode, causes a code corresponding to the derived code of one of the transmitters to be stored in said addressable memory at the one memory address, and said software controlled memory selector identifying another memory address so that the processor, when in its program mode, causes the derived code of a second transmitter to be stored in said addressable*

*memory at the other memory address; said processor, when in its operate mode, determining whether the derived code corresponds with at least one of the stored derived codes and when there is correspondence said processor providing an operating signal to grant access to the area.*

*58. A system according to claim 37 wherein the processor comprises a microprocessor.*

*59. A system according to claim 39 wherein the processor comprises a microprocessor.*

*60. A system according to claim 40 wherein the processor comprises a microprocessor.*

*61. A system according to claim 52 wherein said processor means comprises a microprocessor.*

*62. A system according to claim 57 wherein the processor comprises a microprocessor.*

* * * * *